United States Patent [19]

Mongia et al.

[11] Patent Number: 6,107,693
[45] Date of Patent: Aug. 22, 2000

[54] SELF-CONTAINED ENERGY CENTER FOR PRODUCING MECHANICAL, ELECTRICAL, AND HEAT ENERGY

[75] Inventors: Rajiv K. Mongia, Berkeley; George L. Touchton, Newark; Robert W. Dibble, Livermore; Martin L. Lagod, Atherton, all of Calif.

[73] Assignee: Solo Energy Corporation, Alameda, Calif.

[21] Appl. No.: 09/034,259

[22] Filed: Mar. 4, 1998

Related U.S. Application Data

[63] Continuation-in-part of application No. 08/934,217, Sep. 19, 1997, abandoned.

[51] Int. Cl.[7] .............................. F01D 15/10; H02K 7/18
[52] U.S. Cl. ..................... 290/52; 290/40 A; 290/40 B; 290/40 C; 290/40 F; 290/54; 290/4 R
[58] Field of Search ................................ 296/406, 40 B, 296/40 C, 52, 54; 60/39.58, 736, 39.12, 39.182

[56] References Cited

U.S. PATENT DOCUMENTS

| | | | |
|---|---|---|---|
| 3,623,317 | 11/1971 | Foster-Pegg | 60/39.04 |
| 4,065,917 | 1/1978 | Pfefferle | 60/547 |
| 4,081,956 | 4/1978 | Baker et al. | 60/39.18 |
| 4,152,145 | 5/1979 | Kartsounes et al. | 290/52 |
| 4,202,169 | 5/1980 | Acheson et al. | 60/39.12 |
| 4,414,813 | 11/1983 | Knapp | 60/655 |
| 4,754,604 | 7/1988 | Flory | 60/547 |
| 4,754,607 | 7/1988 | Mackay | 60/723 |
| 4,823,546 | 4/1989 | Cheng | 60/39.04 |
| 4,849,648 | 7/1989 | Longardner | 290/54 |
| 5,321,944 | 6/1994 | Bronicki et al. | 60/39.05 |
| 5,386,688 | 2/1995 | Nakhamkin | 60/39.04 |
| 5,457,951 | 10/1995 | Johnson et al. | 60/39.02 |
| 5,459,994 | 10/1995 | Drnevich | 60/39.02 |
| 5,586,430 | 12/1996 | Stopa | 60/39 |
| 5,632,148 | 5/1997 | Bronicki et al. | 60/728 |
| 5,635,768 | 6/1997 | Birch et al. | 290/40 C |
| 5,687,560 | 11/1997 | Janes | 60/39.58 |

FOREIGN PATENT DOCUMENTS

| | | |
|---|---|---|
| 828 432 | 5/1938 | France . |
| 864 730 | 5/1941 | France . |
| 1 467 142 | 12/1966 | France . |
| 1 524 810 | 5/1968 | France . |
| 541 845 | 12/1941 | United Kingdom . |
| 741 506 | 12/1955 | United Kingdom . |
| 749 267 | 5/1956 | United Kingdom . |

*Primary Examiner*—Elvin Enad
*Attorney, Agent, or Firm*—Burns, Doane, Swecker & Mathis, L.L.P.

[57] ABSTRACT

Various forms of energy, such as mechanical, electrical, and/or heat energy are produced by an energy conversion mechanism which includes a spool, the spool including a shaft on which a compressor and turbine are mounted. A generator is operably connected to the energy conversion mechanism for converting mechanical energy thereof into electrical energy. Fuel and air are supplied separately to the compressor. A regenerator type heat exchanger has a cold side for conducting compressed air traveling from an outlet of a compressor to an inlet of the microturbine, a hot side for conducting hot waste gas from the energy conversion mechanism, and a rotary core movable sequentially through the cold and hot sides for absorbing heat in the hot side and giving up heat in the cold side. A catalytic combustor combusts the fuel at a location upstream of the turbine. During start-up, the catalytic combustor is preheated independently of the heat exchanger by an electric heater.

25 Claims, 5 Drawing Sheets

SELF-CONTAINED ENERGY CENTER FOR PRODUCING MECHANICAL, ELECTRICAL, AND HEAT ENERGY

RELATED INVENTION

This is a continuation-in-part of Ser. No. 08/934,217 filed Sep. 19, 1997 and now abandoned.

BACKGROUND OF THE INVENTION

The present invention relates to a self-contained energy center which can convert chemical energy into mechanical, electrical and heat energy, and methods for carrying this out.

Such self-contained energy centers or cogeneration systems have been proposed, wherein chemical fuel is combined with compressed air from a compressor and is combusted. The resulting hot, high pressure air is delivered to a turbine which powers the compressor as well as electrical generating equipment. There are thus provided mechanical energy, electrical energy, and heat energy (i.e. waste heat from the turbine) which can be utilized to satisfy various needs such as heating, cooling, ventilating, lighting, etc. in a building.

Such a system is disclosed, for example, in U.S. Pat. No. 4,754,607 wherein fuel and air are combined in a mixer. The resulting mixture is delivered to the inlet of a compressor which compresses the mixture and outputs the compressed mixture to the cold side of a recuperator-type heat exchanger in which it becomes heated. The heated, high-pressure mixture is then delivered to the combustion chamber of a catalytic combustor. The resulting products of combustion are directed to the inlet of an expansion turbine mounted on the compressor shaft. After powering the turbine, the hot combustion gases are directed through the hot side of the heat exchanger. Accordingly, heat from those gases is transferred to the cooler air/fuel mixture passing through the cold side of the heat exchanger. The hot combustion gases exiting the hot side of the heat exchanger are delivered to heat-utilizing devices such as a hot water heater. Meanwhile, the turbine drives an electric generator mounted on the compressor shaft for producing electric power.

During start-up of the system, the combustion chamber of the catalytic combustor is too cold to combust an air/fuel mixture. Therefore, a preheat burner, disposed in the conduit which conducts combustion gases from the turbine to the hot side of the heat exchanger, is supplied with fuel to create combustion gases. Those gases are then supplied to the hot side of the heat exchanger for preheating air delivered to the cold side of the heat exchanger from the compressor (which is being motored-over during start-up). The air preheated in the cold side of the heat exchanger is then conducted through the catalytic combustor to heat the latter. Once the catalytic combustor has been sufficiently heated to support combustion, the start-up phase is over, and fuel is mixed with air fed to the compressor. That air/fuel mixture is then preheated in the heat exchanger before being delivered to the catalytic combustor for combustion therein.

The above-described system exhibits certain shortcomings, especially as regards the start-up operation. In that regard, the start-up procedure requires that heat be transferred from a preheat burner to cold air traveling through a recuperator, and a subsequent transfer of that heat from the air to the catalytic reactor. That procedure is highly time consuming. Also, the need for both a catalytic reactor and a preheat burner complicates the system and increases its cost.

Furthermore, the premixing of air and fuel prior to introduction into the compressor requires the use of a separate mixer, which involves added cost and complexity, as well as a potential source of an energy-diminishing pressure drop which increases the parasitic load on the system, causing the compressor to work harder.

Also, during operation of the system, energy demands will vary, calling for changes in temperature of gas delivered to the turbine. To that end, the amount of fuel supplied to the catalytic combustor can be varied. Also, the system provides a valved by-pass whereby some of the exhaust gases can bypass the hot side of the recuperator, whereby the amount of heat being transmitted to the air/fuel mixture passing through the cold side of the recuperator can be varied. However, a recuperator utilizes a relatively massive heat transfer medium, so there is an appreciable delay before a temperature change at the hot side of the recuperator is realized at the cold side. As a result, the reaction time of the system is slower than would be desired.

Accordingly, it is an object of the invention to provide a highly efficient, low cost, simplified cogeneration system which can be rapidly started.

SUMMARY OF THE INVENTION

One aspect of the invention relates to an energy producing apparatus comprising a compressor side for compressing air/fuel, and a turbine side for driving the compressor side. An air supply conduit and a fuel supply conduit conduct air and fuel separately into a compressor of the compressor side to be compressed and mixed therein. An electrical generator is operably connected to the turbine side to be driven thereby for producing electrical energy. A heat exchanger has a first passage for conducting compressed air/fuel traveling from an outlet of the compressor side, and a second passage for conducting hot waste gas from an outlet gas from an outlet of the turbine side in heat exchange relationship with the compressed air/fuel in the first passage. A catalytic combustor is disposed between an outlet of the first passage of the heat exchanger and an inlet of the turbine side for reacting compressed air/fuel mixture received from the first passage prior to entry thereof into the turbine side.

A preheating device is preferably provided for heating the catalytic combustor to a start-up temperature during start-up of the system. The preheating device, for example an electrical heater, is preferably operable to heat the catalytic combustor independently of the heat exchanger.

The preheater could comprise a fuel-burning start-up combustor disposed adjacent to the catalytic combustor.

The heat exchanger preferably comprises a regenerator having a movable (e.g., rotatable) core sequentially passing through the first and second passages for absorbing heat in the second passage and giving up heat in the first passage.

A humidifier could be provided for introducing moisture into the compressed air/fuel prior to entry thereof into the combustor.

A steam generator could be provided to introduce steam into the inlet of the turbine side for starting the turbine side.

A fuel pressurizing mechanism could be provided in the form of a roto cell device which includes a rotor having a plurality of cells spaced circumferentially around an outer periphery thereof for receiving fuel. The roto cell device would be operably connected to the spool to be rotated thereby. A take-off conduit would divert compressed air from the compressor side and introduce the diverted compressed air into the cells for pressurizing the fuel.

Other aspects of the invention relate to various combinations of the above, and other, features. For example, an aspect of the invention relates to a cogeneration apparatus which comprises an energy conversion mechanism including a turbine for converting chemical fuel into energy. An electric generator is operably connected to the energy conversion mechanism for generating electricity. A diagnostic mechanism senses the operating conditions in the energy conversion mechanism. A transmitting mechanism connected to the diagnostic mechanism transmits signals to a central monitoring station.

The invention also involves method aspects. For example, the invention relates to a method of varying a heat-to-electric ratio of a cogeneration system by varying the rate of heat transfer to the compressed gas in the first passage of the heat exchanger.

Another method aspect involves employing a compressor as an air fuel mixer, i.e., the air and fuel are supplied separately thereto.

Another method aspect involves a method of starting a multi-spool energy generating mechanism which includes a plurality of shafts, an expansion turbine mounted on each shaft, and a compressor mounted on at least two of the shafts, the compressors interconnected fluidly in series, and the turbines connected fluidly in series. The method comprises the steps of:

A) causing the compressed air to expand in the upstream turbine for rotating the shaft and compressor associated therewith;

B) venting at least some of the exhaust gas discharged from the upstream turbine, prior to the entry thereof into a turbine disposed downstream of the upstream turbine as the upstream turbine accelerates; and thereafter C) conducting all of the waste gas from the upstream turbine to the downstream turbine after the energy generating mechanism reaches a predetermined operating state.

Another method aspect involves a method of starting a cogeneration system wherein a catalytic reactor is preheated independently of the heat exchanger.

Another method aspect of the invention comprises the provision of a catalytic reactor and a fuel-burning combustor, wherein fuel is combusted in the catalytic combustor during normal operation, and fuel is combusted in the combustor in the event of a failure of the catalytic reactor, in order to supply hot gas to the second passage of the heat exchanger which heats compressed air from the compressor.

BRIEF DESCRIPTION OF THE DRAWINGS

The objects and advantages of the invention will become apparent from the following detailed description of preferred embodiments thereof in connection with the accompanying drawing in which like numerals designate like elements, and in which.

DETAILED DESCRIPTION OF PREFERRED EMBODIMENTS OF THE INVENTION

Figure 1:
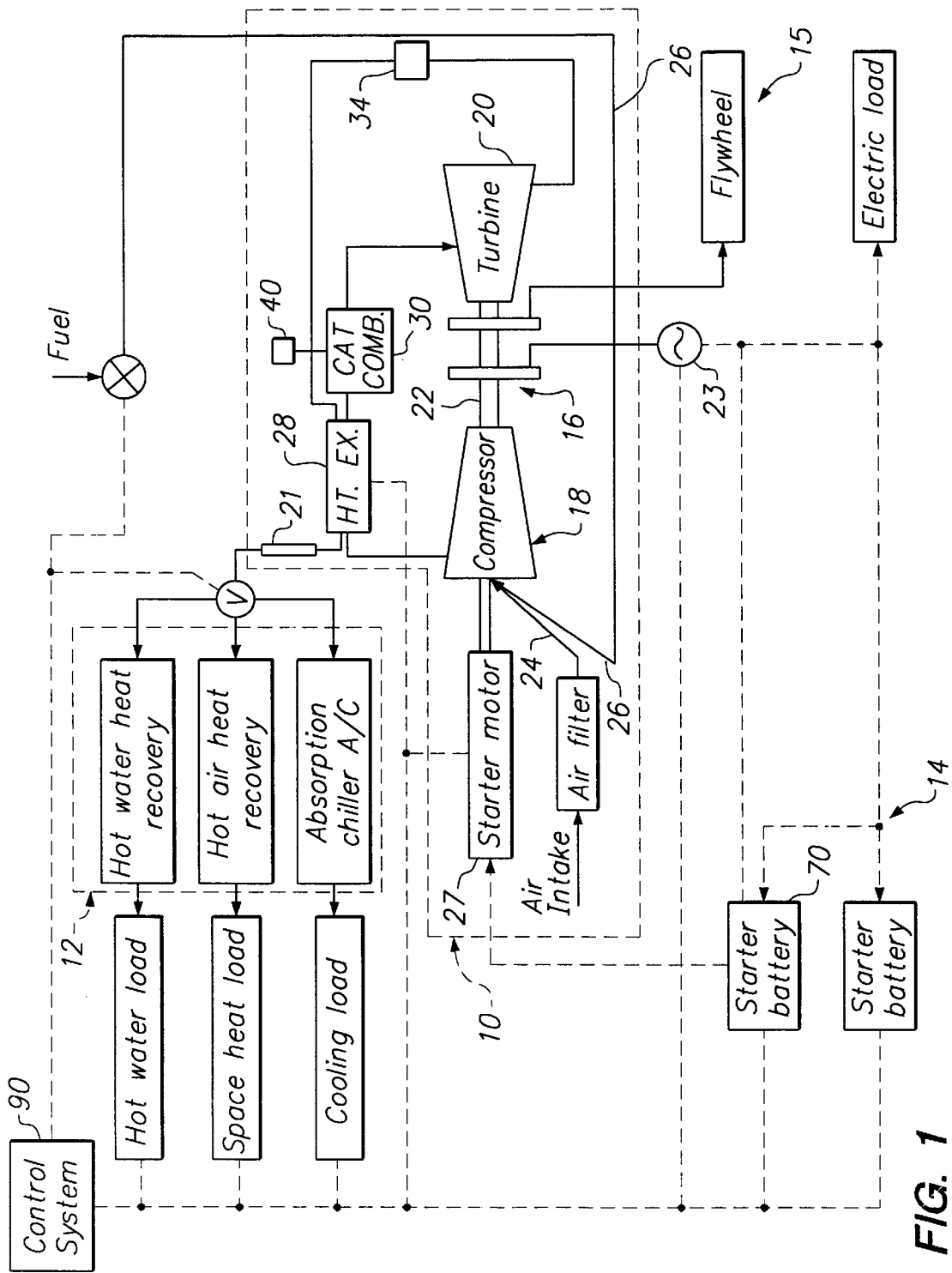
FIG. 1 is a schematic view of a cogeneration system according to the present invention.

Depicted in FIG. 1 is an automated self-contained energy center or cogeneration system including an energy conversion mechanism 10 which converts chemical energy (e.g., combusted fuel) to mechanical and heat energy, a heat utility section 12 for utilizing or storing the heat energy, an electrical utility section 14 for converting some of the mechanical energy into electrical energy for immediate use or storage, and a mechanical utility section 15 (e.g., a flywheel) for immediate use or storage of mechanical energy. The system is ideally suitable for use in small facilities, such as, for example, a residence, a commercial site, or a light industrial site.

Figure 2:
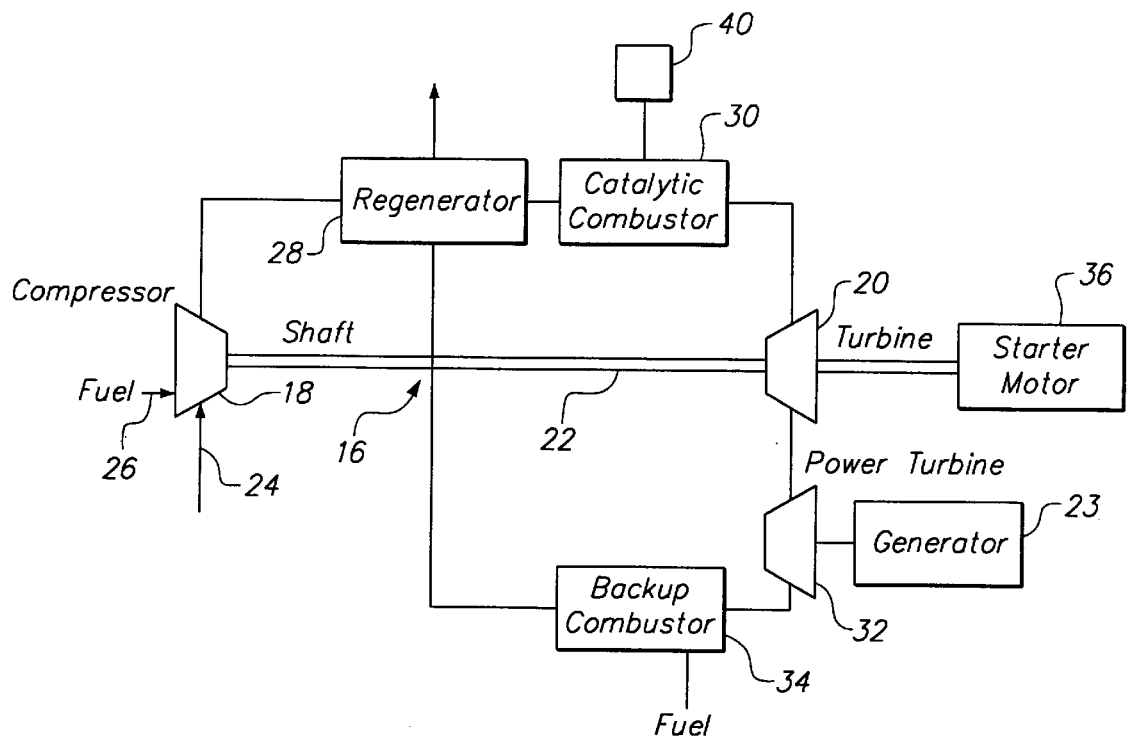
FIG. 2 is a schematic view of a first embodiment of an energy conversion mechanism of the system depicted in FIG. 1.

The energy conversion mechanism comprises a compressor/turbine spool 16, also shown in FIG. 2, comprising a compressor 18 and an expansion turbine 20 interconnected by a shaft 22. During normal operating conditions, air is introduced into the compressor via main duct 24. Fuel is introduced via conduit 26 through the wall at the compressor mouth. The air and fuel are drawn separately into the compressor 18 where they are compressed and mixed, and the compressed air/fuel mixture exiting the compressor is then heated by being passed through the cold side of a heat exchanger 28, which can be of any suitable type, but preferably is a regenerator type of heat exchanger.

The turbine 20, and all turbines used herein, is preferably a conventional turbine, most preferably a turbine having a power output no greater than one megawatt.

The heated air/fuel mixture from the heat exchanger 28 is combusted in a conventional catalytic combustor or reactor 30, such as the type manufactured by Precision Combustion, Inc. of New Haven, Conn., wherein fuel oxidizes on a catalyst surface, and brings the gas temperature to the required operating temperature of the turbine inlet. That gas is then expanded in the turbine 20. Exhaust gas from the turbine 20 is expanded in a power turbine 32 to which an electrical generator 23 is connected. Exhaust gas from the power turbine 32 is then conducted through the hot side of the heat exchanger in heat exchange relationship with air/fuel mixture passing through the cold side of the heat exchanger 28. The heating of the air/fuel mixture in the heat exchanger 28 will have brought the air/fuel mixture to the threshold temperature necessary for oxidation to occur in the catalytic combustor 30. For example, the above-mentioned catalytic combustor of Precision Combustion Inc. needs to be heated to approximately 500° C. The use of a catalytic combustor is beneficial because it only needs an air/fuel molar ratio of about 100, in contrast to a typical non-catalytic combustor which requires an air/fuel molar ratio of about 18. A catalytic combustor is relatively clean burning, emitting less than approximately 1 ppm $NO_x$ and 10 ppm CO. An additional benefit is that the air/fuel mixture will never be in a regime where there will be a fire or explosion danger in the compressor or anywhere in the system.

The system may also include a back-up fuel-burning combustor 34 (optional) located downstream of the power turbine 32 to operate the system in the event that the catalytic combustor 30 malfunctions. Exhaust gas from the back-up combustor would pass through the hot side of the heat exchanger 28 to heat the compressed air/fuel to a sufficient temperature to operate the turbine during an interim period until the catalytic combustor has been repaired.

Figure 6:
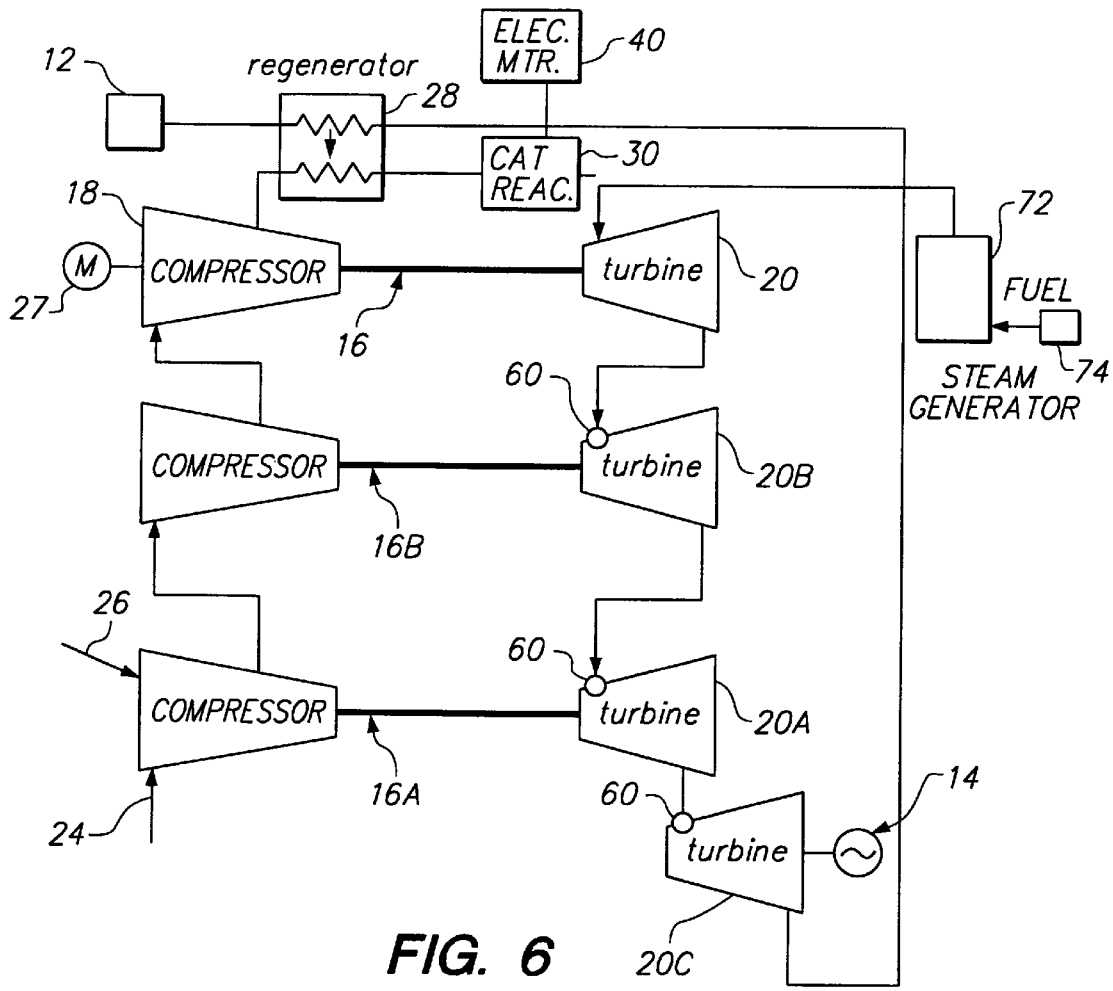
FIG. 6 is a schematic view of a multi-spool type of energy conversion mechanism according to the present invention.

The heat exchanger can comprise any suitable type, but preferably comprises a regenerator which is schematically depicted in FIG. 6 and described in greater detail in concurrently filed application Ser. No. 09/034,394 (Attorney Docket No. 031064-009), the disclosure of which is incorporated by reference herein. The regenerator forms two separate paths in a housing, namely a hot path HP through which hot gases flow, and a cold path CP through which a cold air/fuel mixture flows. A porous heat-transfer core C rotates within the housing such that each portion of the core sequentially travels through the two paths. Thus, the portions of the core traveling through the hot path are heated and subsequently give up that heat to the cold air/fuel flow when traveling through the cold path. Suitable seals are provided to resist leakage between the hot and cold gas flows.

Such a regenerator type of heat exchanger 28 is highly effective, and the rate of heat transfer can be conveniently controlled merely by varying the rate of rotation of the core. The mass of the core is relatively low (e.g., as compared to that of a recuperator). Therefore, the time required to heat such a regenerator is short as compared to a recuperator type of heat exchanger. Principles of operation of a regenerator have been previously known, and regenerators are commercially available, e.g., from Allison Engine Co. of Indianapolis, Ind. The regenerator disclosed in above-referenced Ser. No. 09/034,394 involves a novel sealing arrangement.

The above description has characterized the post start-up state operation of the system, i.e., the state when the catalytic combustor 30 is sufficiently hot to support combustion of the fuel. However, at the initiation of start-up, the catalytic combustor is below its activation temperature. Accordingly, there is provided an electric heater 40, or any other suitable heat generator, which supplies heat to the catalytic combustor to rapidly bring it to its start-up temperature. A conventional heater for a catalytic combustor is disclosed in U.S. Pat. No. 4,065,917, the disclosure of which is incorporated herein by reference.

The start-up phase continues until the catalytic combustor 30 reaches a temperature (i.e., a start-up temperature) which is hot enough to combust fuel.

Once a start-up temperature is reached in the catalytic combustor 30, a starter motor 36 is actuated to rotate the shaft 22, causing fuel and air to be drawn into the compressor 18 and conducted to the catalytic combustor 30.

An alternative way of starting the system involves turning the spool 16 by the starter motor to circulate air (but no fuel) through the cold side of the regenerator while rotating the regenerator. The back-up combustor 34 would be actuated to supply hot gas to the regenerator for heating the air passing through the cold side. That heated air would then pass through, and heat, the catalytic combustor 30.

When the catalytic combustor 30 reaches a start-up temperature, fuel would be introduced to the compressor 30, and the resulting compressed air/fuel would be combusted in the catalytic combustor 30.

Figure 3:
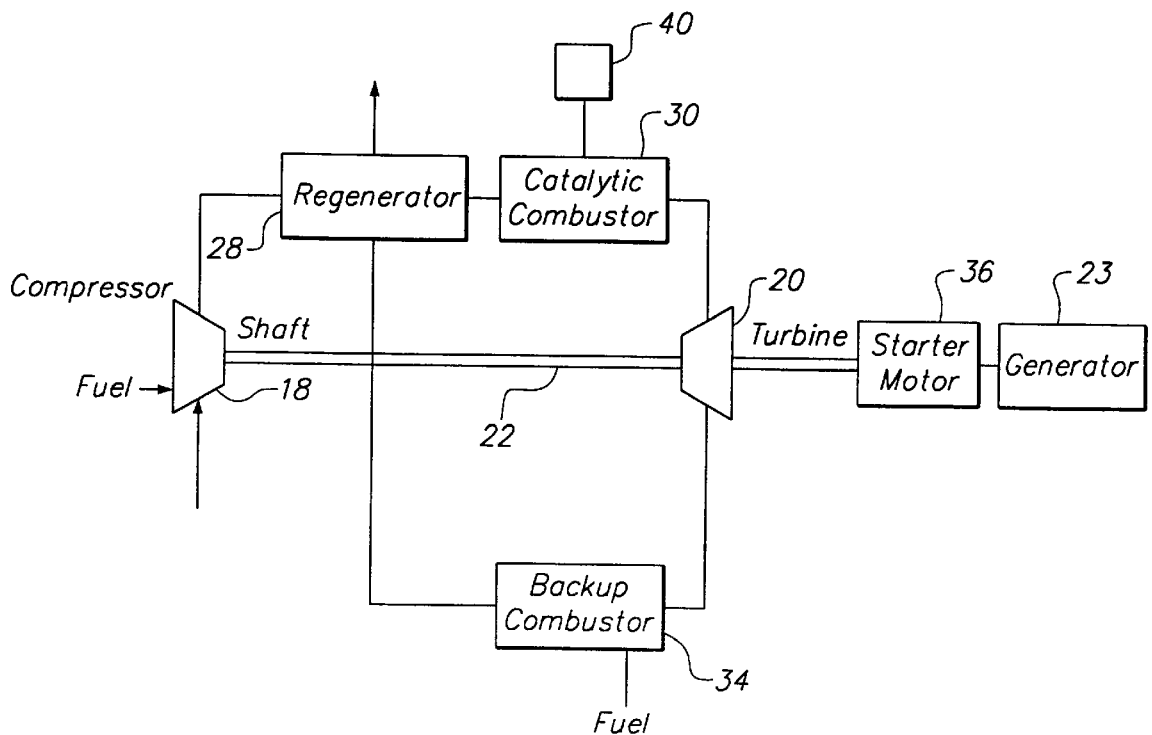
FIG. 3 is a view similar to FIG. 2 of a second embodiment of an energy conversion mechanism according to the invention.

In lieu of driving the electrical generator 23 by a separate power turbine 32, the generator could be driven by the shaft 22, as depicted in FIG. 3.

Figure 4:
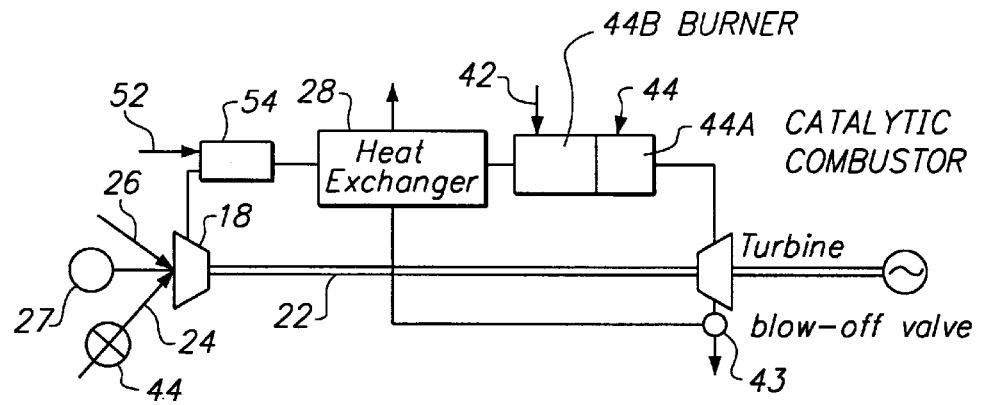
FIG. 4 is a view similar to FIG. 2 of yet another embodiment of an energy conversion mechanism according to the invention.
Figure 5:
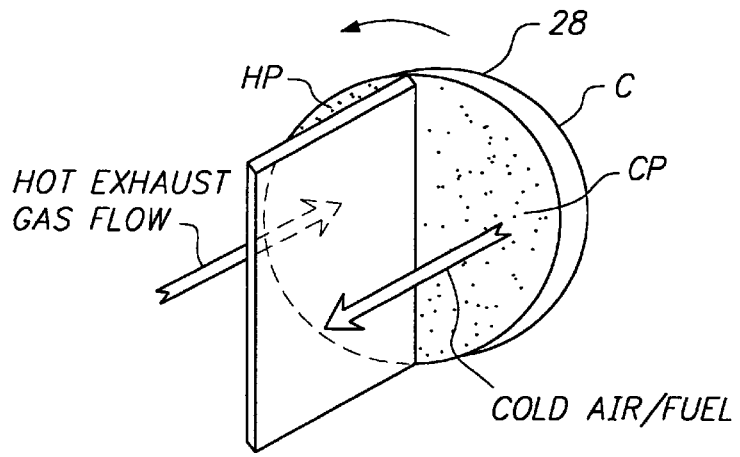
FIG. 5 is a schematic perspective view of a regenerator-type of heat exchanger usable in the present invention.

Yet another arrangement is depicted in FIG. 4 wherein a conventional hybrid fuel combustor 44 is employed. The hybrid combustor includes a catalytic reactor downstream part 44A, and an upstream burner 44B. Only the burner part 44B would be employed during start-up, in order to heat the catalytic reactor part 44A by conduction, radiation and convection. Fuel would be supplied to the burner 44B during start-up, via line 42. After start-up, fuel would be cut off from the burner and introduced into the compressor via line 26. Alternatively, the burner part could be disposed downstream of the catalytic part. During normal start-up of the FIG. 4 arrangement, the compressor is motor-driven at a relatively low speed, so there is not a high pressure at the fuel inlet of the burner part 44B which would inhibit the inflow of fuel. If it were instead desired to motor-drive the compressor at a high speed, a throttle 44 for air flow would be provided at the compressor inlet. By throttling-down, the pressure at the fuel inlet of the start-up combustor can be reduced, in order to facilitate the injection of fuel.

Although a gaseous type of fuel is preferred in the present invention, liquid or solid fuel could be used. For example, the liquid fuel could be atomized, gasified or vaporized. Liquid fuels which can be used include gasoline, naphthas, No. 2 heating oils, diesel, and kerosene. Any solid fuel which is capable of being gasified could be used. Suitable gaseous fuels include natural gas, propane, acetylene, process and refinery gases, and all manner of hydrocarbon mixtures, as well as low-BTU gas.

Since the present invention utilizes an adjustable heat exchanger, i.e., a regenerator 28, the amount of heat transferred from the high-temperature turbine exhaust to the low-temperature compressor discharge can be regulated, and changes in heat transfer at the hot side can be realized almost instantaneously at the cold side. That is, when the core C of the regenerator is spinning at the optimum speed, a maximum amount of exhaust heat is recycled into the turbine to yield the lowest heat-to-electric ratio. At a certain minimum rotation speed of the core C, there will occur a maximum heat-to-electric ratio.

Thus, by varying the rate of spinning of the regenerator core, the heat-to-electric ratio can be varied between the two extremes. The efficiency of the heat exchanger can be monitored by temperature sensors located upstream and downstream thereof, enabling the heat transfer rate to be automatically controlled to achieve the desired effectiveness.

The ability to adjust the rate of heat transfer in the heat exchanger provides another advantage, namely the ability to provide, in effect, an instantaneous reduction in load. Typical recuperator-type heat exchangers have substantial thermal mass. That means that the gases in the machine stay hot for a long period after there has been a command to reduce the load output. In contrast, since the efficiency of the regenerator in the presently claimed invention can be instantly spoiled, the gases can be more rapidly cooled to provide a rapid response to a load reduction command.

Conventional features can be employed to increase shaft power and efficiency in systems of the type disclosed in connection with FIGS. 2–4. That is, as shown in FIGS. 4, water can be supplied via conduit 52 to be combined with the compressed air/fuel mixture traveling to the heat exchanger. The water can be mixed with the compressed air/fuel mixture in a conventional saturator 54. This humidification of the air increases the mass flow of the turbine 20 while making the heat collected by the water prior to its introduction into the saturator available for utilization in the expansion process within the turbine. Thus, the added water increases shaft power and efficiency. When this shaft power is transformed into electrical energy, the electric-to-heat ratio is increased. By varying the water flow rate to the saturator, or altering the ratio of water to air in the saturator, or changing the place where moisture is injected into the saturator, the degree of humidification of the air can be varied to produce an optimum electric-to-heat ratio. Although only shown in connection with FIG. 4, the saturator 54 could be utilized in the systems described in connection with FIGS. 2 and 3.

It will be appreciated that due to the combination of the above-described techniques for varying the electric-to-heat ratio, i.e., varying the amount of heat transferred in the regenerator 28 and varying the amount of humidification applied in the saturator 54, a high degree of control over the electric-to-heat ratio can be achieved. By thus monitoring the electric and heat loads in the building and automatically correspondingly varying the electric-to-heat ratio, an optimum fuel utilization can be achieved by adjusting the spinning rate of the heat exchanger core and/or the amount of humidification of the compressed air.

Depicted in FIG. 6 is a multi-spool embodiment of the invention which realizes the advantages explained earlier in connection with the low-pressure fuel introduction. As explained earlier herein, the start-up mode of a conventional multi-spool arrangement is time-consuming and also is costly from a fuel expenditure standpoint. In addition, it requires significantly more power from the starter motor or starting device to turn the multiple shafts of a multi-spool machine during startup. The present invention alleviates those shortcomings by providing a valve, or so-called waste gate 60 in conjunction with at least one (but preferably both) of the turbines 20A, 20B of the lower compressor/turbine spools 16A, 16B, and also the power turbine 20C (if such an optional power turbine 20C is used). Such a waste gate 60 enables some or all of the high pressure gas to be vented to atmosphere thereby minimizing the occurrence of pressure build-up in the upstream turbine, or starter turbine 20. That makes the starter turbine easier to operate. The waste gate could be installed at, or upstream of, the turbine inlet.

It is noted that waste gates per se are conventional and have typically been used on turbochargers of reciprocating internal combustion engines for venting some of the turbine inlet air when the exit pressure at the compressor is too high for the strength of the combustion engine construction. By thus venting some of the air that would otherwise drive the turbine of the turbocharger, the compressor is driven more slowly, so the exit pressure is reduced to a safe level. The use of a waste gate in the present invention achieves a different result, i.e., to keep the downstream turbines at low pressure until the upstream turbines speed up.

During start-up, the electric heater 40 heats the catalytic combustor as described earlier herein (no fuel as yet being supplied via conduit 26). At this time, the waste gates 60 associated with either or both of the lower turbines 20A, 20B are fully or partially opened for venting the incoming air. Once the catalyst is heated to its light-off temperature, the starter motor is started and fuel is added. Because the downstream spools have open waste gates, the first turbine 20 can be started relatively easily, quickly, and efficiently. Once the starter turbine 20 of the spool 16 is at a predetermined speed (or the downstream compressor of the spool 16 reaches a predetermined discharge pressure) and the starter motor 27 has been shut off, the waste gate on the next turbine 20B is closed. Hence, the spool 16B starts to spin and eventually reaches the predetermined speed, whereupon the waste gate 60 of the next turbine 20A is closed and it, too, begins to spin.

It will be appreciated that the use of waste gates in that fashion will enable the start-up operation of a multi-spool arrangement to be carried out relatively easily and quickly, with reduced fuel costs. In addition, this procedure could be carried out with conventional (non-catalytic) combustors and without the heat exchanger 28.

It should be noted that mechanical energy from any or all of the spools 16, 16A, 16B, or a spool of the power turbine 20C, can be utilized, e.g., to generate electric energy.

The systems described thus far have relied upon a starter motor 27 (e.g., an electric motor) for the start-up procedure. It will be appreciated that there may occur the need to start the system when there is no connection available to a working electric grid (e.g., during a power black-out) or an external fuel source. One way of achieving this is to utilize a storage battery 70 as shown in FIG. 1 for driving the starter motor.

Another way of providing for a total black start capability is through the use of a steam generator 72, shown in FIG. 6, which can be used in combination with, or in lieu of, the storage battery/starter motor arrangement. The steam boiler is connected to an in-house fuel supply such as a tank 74 of liquid fuel or natural gas supplied through a pipeline. The steam generator is pre-supplied with water which, when necessary, is heated by a burner connected to the fuel tank, to supply steam for driving the turbine 20. The steam could be introduced to the turbine inlet, or it could be injected directly into the turbine via nozzles to impinge directly against the turbine blades. This rotates the turbine which in turn drives the compressor to begin the air flow and start the system. Once the system is up and running at full speed, the electrical utility section 14 produces electrical power to assist with normal operations, such as powering the onboard control and communication system.

Figure 7:
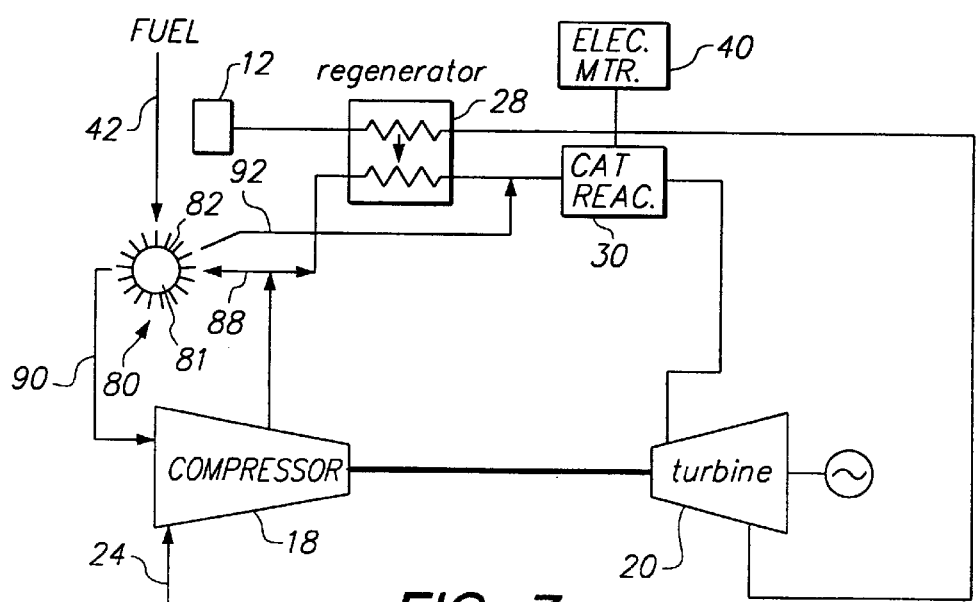
FIG. 7 is a schematic view of another embodiment of energy conversion mechanism according to the invention, wherein a roto cell device is utilized to pressurize fuel.

The steam generator 72 is shown in combination with the multi-spool arrangement of FIG. 7, but it could be used with the single-spool arrangements of FIGS. 2–4 as well. When used in a multi-spool arrangement, wherein the turbines are equipped with the previously described waste gates 60, the black start can be further facilitated by opening the waste gates 60 in the previously described manner.

Other ways of producing steam, in lieu of the boiler 72, include the catalytic decomposition of stored hydrogen peroxide, and the use of energy released by absorbing hydrogen gas onto a palladium surface or other suitable surface.

Figure 8:
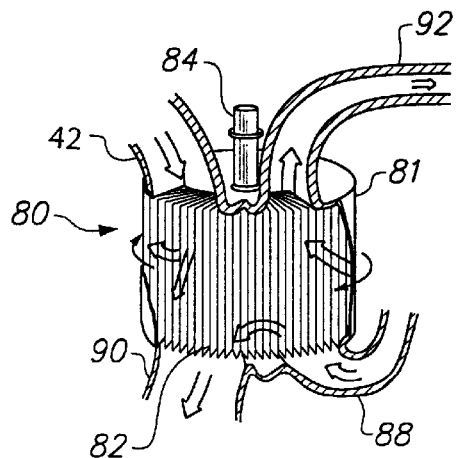
FIG. 8 is a schematic perspective view of roto cell device for pressurizing fuel.

As noted earlier herein, the present invention envisions that no means will be necessary to highly pressurize the fuel being supplied to the system since the fuel is introduced at low-pressure locations. In the event however, that it should prove necessary to pressurize the fuel to a level above the inlet pressure (up to the compressor discharge pressure), a highly efficient system for doing so is depicted in FIGS. 7 and 8. In that system, there is provided a conventional roto cell compressor 80 of the type sold by ASEA Brown Boveri (ABB) and described in SAE Technical Paper 830–234, March 1983, which is incorporated herein by reference. That compressor includes a rotor 81 forming circumferentially spaced cells 82 on its outer periphery. The rotor is rotated by a shaft 84 which is operably connected to the shaft 22 of the spool, and low pressure gaseous fuel is introduced sequentially into the cells via conduit 42. Some of the high-pressure air from the compressor is diverted to the cells via conduit 88 following the introduction of the fuel, whereby the air expands in the cells and pressurizes the fuel which is supplied to the catalytic combustor via conduit 92. The spent air is then routed via conduit 90 to the inlet to preclude any leakage of fuel gas to the atmosphere. An advantage of such an arrangement is that the small mechanical force for rotating the rotor, and the high-pressure air for compressing the fuel are generated by the highly efficient spool mechanism 16, whereby no additional fuel pressurizing devices are necessary.

It will be appreciated that the present invention provides a self-contained energy center which is smaller, and less complex and costly than conventional cogeneration systems, and can be quickly started. The energy center can be safely and efficiently operated by many types of readily available chemical fuels. Accordingly, the center is highly suitable for use in small facilities where it can be driven by natural gas received from low pressure delivery pipes. Accordingly, a home or other small facility can generate all of its energy needs independently of traditional electric utilities which may be characterized by periodic outages.

In the event that it proves necessary to pressurize the fuel before it is introduced into the air stream, a method for doing so is provided which avoids using a gas compressor separate from the existing hardware. Furthermore, the electric-to-fuel ratio produced by the system can be adjusted in order to match the fluctuating electric and heating loads of the building.

The invention enables a multi-spool system to be started more quickly and efficiently. This also is useful when the need arises for a total black start, e.g. by the use of steam power or the like for operating the spool.

Figure 9:
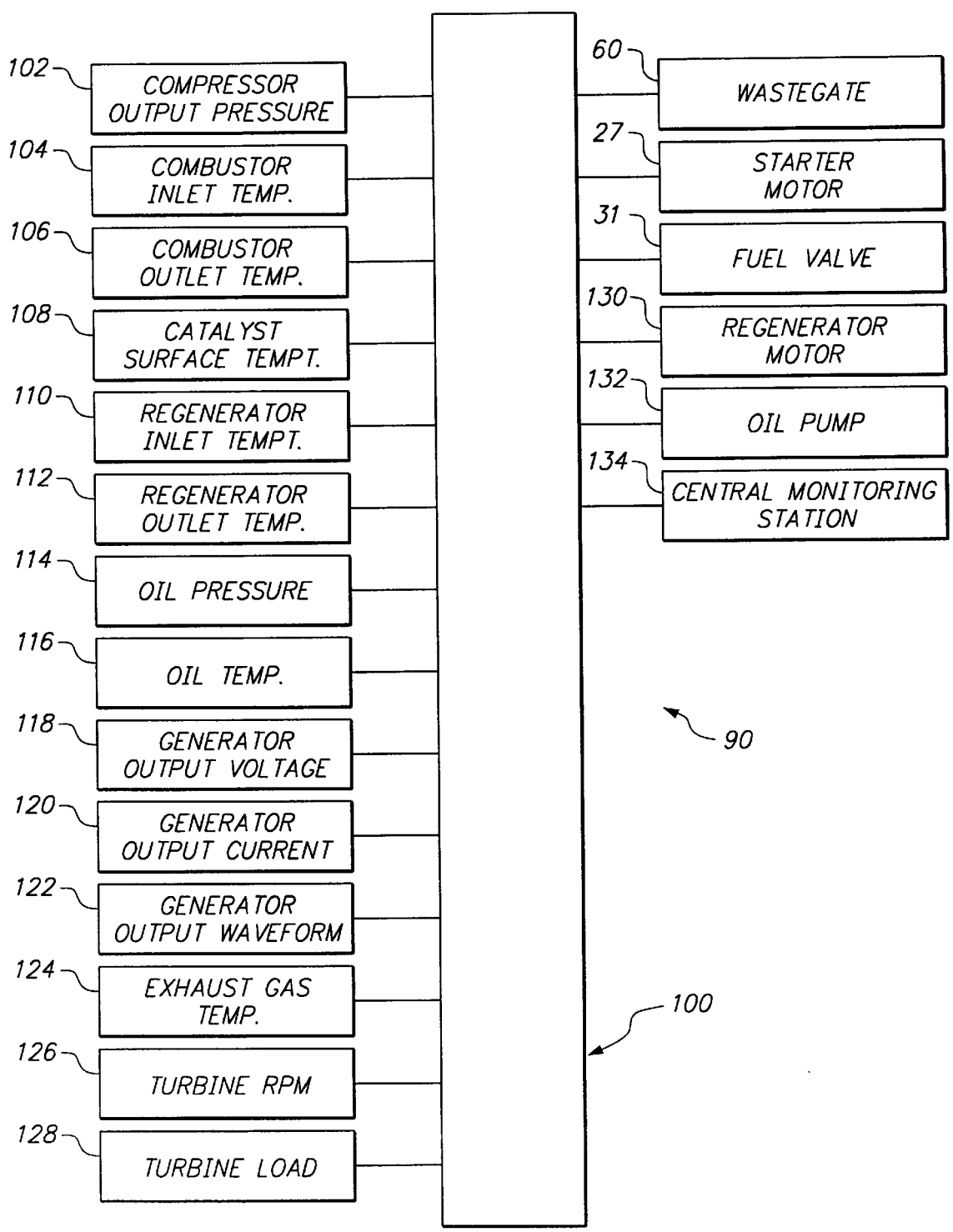
FIG. 9 is a block diagram depicting a control mechanism according to the present invention.

The present invention also envisages a control system which provides the energy center with a high degree of control and reliability. The control system, depicted in FIG. 9, includes suitable computing devices 100 to which are connected numerous on-board sensors for continuously supplying data associated with the operating components of the energy center. For example, a sensor 102 senses compressor output pressure, a sensor 104 senses combustor inlet temperature, a sensor 106 senses combustor outlet temperature, a sensor 108 senses catalyst surface temperature, a sensor 110 senses regenerator inlet temperature, a sensor 112 senses regenerator outlet temperature, a sensor 114 senses oil pressure, a sensor 116 senses oil temperature, a sensor 118 senses generator output voltage, a sensor 120 senses generator output current, a sensor 122 senses generator output waveform, a sensor 124 senses exhaust gas temperature, a sensor 126 senses turbine RPM, and a sensor 128 senses turbine load (e.g., by sensing torque). The control system is also connected to the operable components of the energy center, including, but not limited to, the starter motor 27, the fuel valve 31, a regenerator motor 130, an oil pump 132, wastegates 60, and a central monitoring station 134. The control system controls all aspects of machine operation, including the start-up sequence, wastegate operation, fuel metering, and regenerator rotation speed, for example. In the event that a building contains multiple cogeneration systems of the above-disclosed type, the control system would selectively turn units on and off and control the fuel to each unit in response to the load. In addition, the control system will keep track of part-load operation history in a multi-system configuration, to be able to cycle individual machines to evenly distribute the wear between them.

The control system also contains conventional diagnostic software capable of determining if there is a fault on board, and taking necessary remedial action. For example, if oil pressure were sensed as being low, the control system could operate the oil pump at a faster speed to boost oil pressure. Also, the control system could communicate the existence of such a fault to the central monitoring station 134. That would alert service personnel who could respond to the situation. Moreover, the service personnel could call up the status of a particular energy center twenty four hours per day and receive a full report on the status and performance history thereof. In addition, the control system will allow the operation of the energy center to be remotely controlled by an operator communicating over a communications network.

If the energy center were used in conjunction with other "smart" technology, such as LONWorks (available from Echelon, Inc.), the control system would process requests for additional power and ramp the turbine(s) to meet the load while controlling which power requests are satisfied at a given point in time. This is known as "demand-side" management. For example, upon the starting of a refrigerator compressor, which typically requires a large power input, the control system would control the energy center to increase the power output. Once the power output was matched to the requirement of the new load, the control system would turn the refrigerator compressor on. Alternatively, if the control system were instructed by the user that the refrigerator compressor was an "essential" load, the control system would divert power from inessential loads to meet the refrigerator compressor load immediately.

The self-contained energy center can be combined with a local or wide-area network which employs, or is independent of, the present electrical infrastructure. An integrated digital communication and control system (DCCS) 90 can be provided which supplies load regulation, energy management fuel control, and in some embodiments, communication and integration with loads served, with other centers, with dispatch centers, with monitoring, diagnostic, and maintenance centers. The DCCS may serve in load following or in load control modes. For example, in load following, a dispatch demand signal may be received, and electrical load increased or decreased at a rate and to a level appropriate for the signal. In load control, the DCCS may anticipate the need for an essential electrical load (lighting for example) and may postpone a non-essential load such as refrigeration or water heating to manage fuel demand. The DCCS will interface and be compatible with, distributed controller technology, and other "smart building" technology. Possible methods that can be employed will be apparent to those skilled in the art, including, but not limited to: (1) feedback, (2) multivariable, (3) expert system, and (4) fuzzy logic. The DCCS is capable of interacting with individual component loads at the served site to smooth peaking requirements and optimize energy usage. The system could be made self-diagnostic, and able to communicate its condition to central locations using modems, communication via the electrical supply system, radio, and other means.

The energy center can be used in a residence, a commercial site, or a light industrial site for satisfying the usual needs such as heating, ventilation and air conditioning. The invention can satisfy heating needs by, for example, (a) the generation of electricity which is converted to heat energy, or (b) the use of waste gas from the heat exchanger. Ventilation needs can be satisfied by fans driven by the generated electricity. Air conditioning or other cooling needs can be satisfied by, for example, (a) generation of electricity which is then converted to mechanical energy (shaft rotation, reciprocation, etc.) for mechanical refrigeration or heat energy which, in turn, drives refrigeration cycles such as vaporization/condensation cycles or heat absorption chillers, (b) conversion of fuel chemical energy to mechanical energy which is input to a refrigeration cycle, and (c) recovery of heat energy from direct firing or from exhaust heat recovery by an absorption chiller or vaporization/condensation refrigeration cycle. In addition, hot water needs may be served by, for example, (a) generation of electricity which is then converted to heat energy, (b) recovery of energy from a refrigeration cycle, and (c) recovery of heat energy from direct firing or from exhaust heat recovery. All of these may be used for on-demand water heating or for heating water to be used as thermal energy.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An energy producing apparatus comprising:
    an energy conversion mechanism comprising a compressor side for compressing air/fuel, and a turbine side for driving the compressor side;
    an air supply conduit and a fuel supply conduit for conducting air and fuel separately into a compressor of the compressor side to be compressed and mixed therein, wherein only one stream of compressed air/fuel mixture exits the compressor side;
    an electrical generator operably connected to the turbine side to be driven thereby for producing electrical energy;
    a heat exchanger having a first passage for conducting the stream of compressed air/fuel mixture traveling from an outlet of the compressor side, and a second passage for conducting hot waste gas from an outlet of the turbine side in heat exchange relationship with the stream of compressed air/fuel mixture in the first passage; and
    a catalytic combustor disposed between an outlet of the first passage of the heat exchanger and an inlet of the turbine side for reacting compressed the air/fuel mixture received from the first passage prior to entry thereof into the turbine side;
    wherein the entire compressed stream of air/fuel mixture exiting the compressor side passes through the heat exchanger, and all of the fuel entering the catalytic combustor passes first through the compressor side and the heat exchanger during steady state operation of the apparatus.

2. The apparatus according to claim 1, further including preheating means for heating the catalytic combustor to a start-up temperature during start-up.

3. The apparatus according to claim 2, wherein the preheating means is operable to heat the catalytic combustor independently of the heat exchanger.

4. The apparatus according to claim 3 wherein the preheating means comprises an electric heater.

5. The apparatus according to claim 1 wherein the preheating means comprises a fuel burning start-up combustor disposed adjacent to the catalytic combustor.

6. The apparatus according to claim 1, further including a blow-off valve communicating with an outlet of the turbine side for conducting turbine waste gas away from the heat exchanger during start-up.

7. The apparatus according to claim 1 further including a fuel burning back-up combustor located between an outlet of the turbine side and an inlet of the second passage of the heat exchanger.

8. The apparatus according to claim 1 wherein the heat exchanger comprises a regenerator having a movable core sequentially passing through the first and second passages for absorbing heat in the second passage and giving up heat in the first passage.

9. The apparatus according to claim 8 wherein a speed of the core of the regenerator is adjustable to vary an amount of heat transferred to compressed air/fuel traveling through the first passage.

10. The apparatus according to claim 8 wherein the core of the regenerator is rotatable about an axis of rotation.

11. The apparatus according to claim 1 wherein the turbine side constitutes a first turbine mounted on a common shaft with a compressor of the compressor side, and a second turbine having an inlet fluidly connected to an outlet of the first turbine; the generator operably connected to the second turbine; the second passage of the heat exchanger connected to a waste gas outlet of the second turbine.

12. The apparatus according to claim 1, further including a humidifier for introducing moisture into the compressed air/fuel prior to entry thereof into the catalytic combustor.

13. The apparatus according to claim 12 wherein the humidifier comprises an adjustable humidifier for varying the moisture introduced into the compressed air/fuel.

14. The apparatus according to claim 1 further including a steam generator arranged to introduce steam into the inlet of the turbine side for starting the turbine side.

15. The apparatus according to claim 1 further comprising a fuel pressurizing mechanism for pressurizing fuel delivered to the compressor side, the fuel pressurizing mechanism comprising a roto cell device including a rotor having a plurality of cells spaced circumferentially around an outer periphery thereof for receiving fuel, the roto cell device operably connected to the spool to be rotated thereby, and a take-off conduit for diverting compressed air from the compressor side and introducing the diverted compressed air into the cells for pressurizing the fuel.

16. The apparatus according to claim 1 wherein the turbine has a power output no greater than one megawatt.

17. The apparatus according to claim 1 further comprising diagnostic means for sensing operating conditions in the energy conversion mechanism; transmitting means connected to the diagnostic means for transmitting signals to a central monitoring station; and means for local and/or remote station monitoring and operation.

18. The apparatus according to claim 1 further including a heat utilization device connected to the second passage for recovering heat from the waste gas exiting the heat exchanger.

19. An energy producing apparatus comprising:
    an energy conversion mechanism comprising a compressor side for compressing air, and a turbine side for driving the compressor side;
    an air supply for conducting air into a compressor of the compressor side;
    an electrical generator operably connected to the turbine side to be driven thereby for producing electrical energy;
    a heat exchanger having a first passage for conducting all of the compressed air traveling from an outlet of the compressor side, and a second passage for conducting hot waste gas from an outlet of the turbine side in heat exchange relationship with the compressed air in the first passage;

a combustor disposed between an outlet of the first passage of the heat exchanger and an inlet of the turbine side for reacting a compressed air/fuel mixture received from the first passage prior to entry thereof into the turbine side; and a fuel supply mechanism for supplying pressurized fuel downstream of the compressor side, the fuel supply mechanism comprising a roto cell device having a driven rotor forming a plurality of cells spaced circumferentially around an outer periphery thereof for receiving fuel, and a take-off conduit for diverting compressed air from the compressor side and introducing the diverted compressed air into the cells for pressurizing the fuel.

20. The energy producing apparatus according to claim 19 further including a conduit for conducting the pressurized fuel into mixing relationship with compressed air from the compressor, at a location upstream of the combustor.

21. The energy producing apparatus according to claim 19 wherein the rotor is operably connected to a driven shaft of the energy conversion mechanism to be driven thereby.

22. The energy producing apparatus according to claim 19 including a conduit for conducting the diverted compressed air from the rotor to the combustor.

23. The apparatus according to claim 19 further including a heat utilization device connected to the second passage for recovering heat from the waste gas exiting the heat exchanger.

24. The apparatus according to claim 19 wherein the heat exchanger comprises a regenerator having a movable core sequentially passing through the first and second passages for absorbing heat in the second passage and giving up heat in the first passage.

25. An energy producing apparatus comprising:

an energy conversion mechanism comprising a compressor side for compressing air/fuel, and a turbine side for driving the compressor side;

an air supply conduit and a fuel supply conduit for conducting air and fuel separately into a compressor of the compressor side to be compressed and mixed therein;

an electrical generator operably connected to the turbine side to be driven thereby for producing electrical energy;

a heat exchanger having a first passage for conducting compressed air/fuel traveling from an outlet of the compressor side, and a second passage for conducting hot waste gas from an outlet of the turbine side in heat exchange relationship with the compressed air/fuel in the first passage;

a catalytic combustor disposed between an outlet of the first passage of the heat exchanger and an inlet of the turbine side for reacting compressed air/fuel mixture received from the first passage prior to entry thereof into the turbine side; and a fuel pressurizing mechanism for pressurizing fuel delivered to the compressor side, the fuel pressurizing mechanism comprising a roto cell device including a rotor having a plurality of cells spaced circumferentially around an outer periphery thereof for receiving fuel, the roto cell device operably connected to the spool to be rotated thereby, and a take-off conduit for diverting compressed air from the compressor side and introducing the diverted compressed air into the cells for pressurizing the fuel.

* * * * *